MULTIPLIER AND DIVIDER WITH LOGARITHMIC AND EXPONENTIAL STAGES COUPLED TOGETHER

Filed Nov. 7, 1963

2 Sheets-Sheet 1

Inventors.
PANCHANAN KUNDU
SATYABRATA BANERJI
By Hammond & Littell
Attorneys

Inventors
PANCHANAN KUNDU
SATYABRATA BANERJI
By Hammond & Littell
Attorneys

United States Patent Office 3,393,306

Patented July 16, 1968

3,393,306

MULTIPLIER AND DIVIDER WITH LOGARITHMIC AND EXPONENTIAL STAGES COUPLED TOGETHER

Panchanan Kundu, 20A Pashupati Bose Lane, Calcutta 3, and Satyabrata Banerji, 3 Ramani Chatterjee Road, Calcutta 29, both of West Bengal, India Filed Nov. 7, 1963, Ser. No. 324,599
Claims priority, application Great Britain, Nov. 13, 1962, 42,880/62
18 Claims. (Cl. 235—195)

This invention relates to an electronic analogue multiplier and divider.

Multiplication and division of an A.C. signal by two respective variables, besides being an integral part in analogue computation, are essential operations in modulation, amplitude stabilization, volume compression and volume expansion of signals in the audio, video and radio frequency ranges used in multiple channel communication, tele-metering, control and instrumentation.

Several circuits are already known in the art for the multiplication of a signal. Such circuits consist, for example, of passing two D.C. input signals into two separate logarithmic circuits, the anti-logarithm of the algebraic sum of the two logarithmic outputs giving the product. However, the principal disadvantage associated with such circuits is the occurrence of a drift, namely the variation of the output voltage, even though the input voltage remains constant. Another disadvantage often found with such circuits is the difficulty of providing a common terminal for the different inputs and the output. To overcome this disadvantage, it was suggested to use a pulse width pulse amplitude multiplier. Though this multiplier did obviate to a certain extent the above disadvantages, the circuit connection is complicated.

Furthermore, most of the multipliers used in practice involve the use of nonlinear or multivariable elements which require power series approximations of their characteristics and are thus inherently inaccurate and limited in range. Besides, there is a rising nonlinear distortion in such systems for an increasing input A.C. signal.

Another type of multipliers known in the art are the servo multipliers. However, such a multiplier has proved to be slow acting and suitable only for low frequencies.

In a paper titled "Transistorized Electronic Analogue Multiplier," appearing in the Journal "The Review of Scientific Instruments," the authors Deb et al. have suggested a multiplier circuit using only an exponential current and voltage characteristics of a transistor. We have found, by experiments, that a disadvantage of this circuit is that the output also appears as a power series of the input signal and hence severe restrictions have to be imposed in order that the higher terms or harmonics may be avoided. By certain approximations it appears that the authors obtained a product of two signals supplied at the input. Besides this circuit does not result in a linear multiplication and possesses inherent inaccuracies.

The object of this invention is to propose a circuit wherein the multiplication and/or division of a signal may be carried out simultaneously or separately.

According to this invention there is provided an electrical analogue multiplier and divider having a circuit which includes a logarithmic stage coupled to an exponential stage, said logarithmic and exponential stages being each fed by an A.C. signal and a variable D.C. signal. The A.C. carrier or signal fed to the exponential stage is the output of the coupling stage or circuit.

In accordance with this invention the linear multiplier and divider circuit comprises a logarithmic stage, a coupling stage and an exponential stage circuit. Instead of the coupling stage it is also possible to have only a coupling circuit.

In accordance with one embodiment of this invention, the circuit includes a logarithmic stage, a coupling stage and an exponential stage, said logarithmic and exponential stage being each fed by an A.C. carrier and a variable D.C. signal. The A.C. carrier and a variable D.C. signal is fed to a semi-conductor junction of the logarithmic stage. A separate variable D.C. signal and the A.C. output of the logarithmic stage passing through the coupling stage, is fed to the semi-conductor junction of the exponential stage.

The coupling stage which includes a transistor has a high input impedance and a low output impedance, said coupling stage being connected with the output of the logarithmic stage through a low coupling impedance for the A.C. carrier. It is necessary that the coupling stage should act as a linear amplifier. The exponential stage includes a semi-conductor junction, the input of said junction being connected to a low impedance of the coupling stage for the A.C. voltage or carrier and to a high impedance for the variable D.C. signal. The semi-conductor junction in both the logarithmic and exponential stage may, for example, be the emitter base junction of a transistor.

The term logarithmic stage herein described refers to a circuit in which an output may be obtained which is a logarithmic function of its input signal.

The term exponential stage herein described refers to a circuit in which an output may be obtained which is an exponential function of an input signal.

According to another embodiment of the invention, the multiplier and divider circuit includes a logarithmic stage, a coupling circuit and an exponential stage. The coupling circuit includes a capacitor which provides a low impedance to the A.C. output signal of the logarithmic stage, and blocks the D.C. output of the logarithmic stage signal and simultaneously offers a high impedance to the variable component of the D.C. variable signal applied to the logarithmic stage and as well as to the exponential stage. The exponential stage includes a semi-conductor junction, the input of said junction being connected to said low impedance of the coupling circuit for the A.C. voltage or carrier and to a high impedance for the variable D.C. signal. The semi-conductor junction in the exponential stage may, for example, be the base emitter junction of a grounded emitter or grounded base transistor which has a higher emitter base resistance than that of said junction used for the logarithmic stage.

The multiplier and divider of this invention may be used for various applications such as for e.g. a computing amplifier providing root law and power law of a signal amplitude modulation, volume compression and expansion, and amplitude stabilization. The multiplier and divider when used for such applications are connected to an appropriate associate circuit as herein described.

When used, for example, as a compressor, the A.C. signal is fed to the electrical analogue multiplier and divider circuit of this invention, said circuit having D.C. polarising potential at the exponential emitter base junction, an amplifier connected to the feed back loop of said circuit, the output of said amplifier being connected to a linear rectifier, the D.C. output of said rectifier is fed to the emitter base junction of the logarithmic stage.

When used, for example, as an expander, the signal is fed to the multiplier and divider of the present invention, said signal being also fed to a linear rectifier to convert it to D.C., said D.C. output being connected to the emitter base junction of the exponential stage of said multiplier and divider circuit, a polarizing D.C. signal being provided in the logarithmic stage of said circuit.

The linear rectifier has a circuit which includes a rectifier in series with a capacitor, said rectifier and capacitor being connected across the input terminals of the A.C. signal, a resistor or resistors in series with a non-linear resistor, such as a semi-conductor, connected across siad capacitor. The rectified output is taken across the resistor and the nonlinear resistor. It is also possible to use a linear rectifier of the type already known in the art.

In accordance with this invention it is also possible to cascade the circuit in order to increase the number of the variable D.C. signals.

*Theory of operation*

Figure 1:
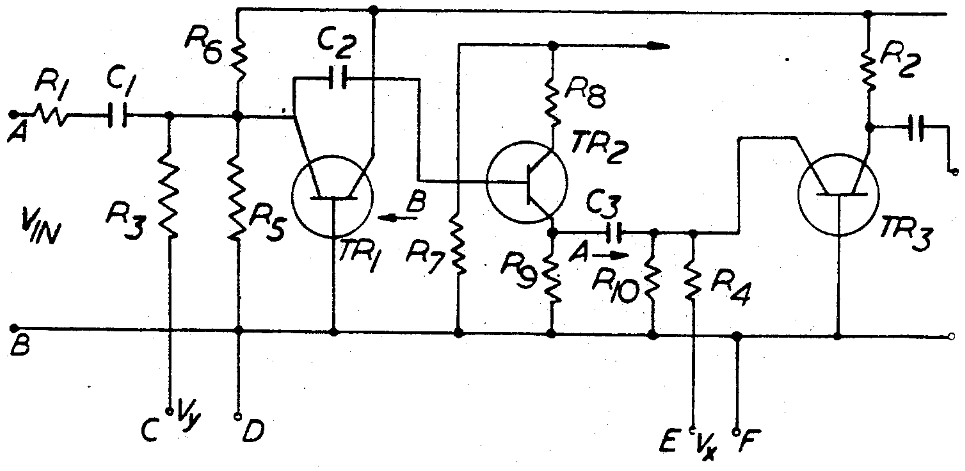
FIG. 1 shows the electronic analogue, a multiplier and divider circuit of this invention.

When the A.C. output component from a logarithmic element due to an input consisting of an A.C. superimposed on a D.C. is subjected to an exponential variation, then the magnitude of the A.C. output of the exponential stage varies inversely as the D.C. input. If the said input to the exponential stage is also mixed with the logarithm of another signal then the output obtained further becomes a linear product of the latter signal. These reciprocal nonlinearities have been realised by properly selecting the dependent and independent variables of current vs. voltage characteristics of a semiconductor junction.

Analytic expressions which relates the emitter and collector currents to the respective junction voltages of a p-n-p transistor may be expressed as:

$$I_E = I_{ES}\left(\epsilon^{\frac{E_{EB}}{p}} - 1\right) - \alpha_I I_{CS}\left(\epsilon^{\frac{E_{CB}}{p}} - 1\right) \quad (1)$$

$$I_C = -\alpha_N I_{ES}\left(\epsilon^{\frac{E_{EB}}{p}} - 1\right) + I_{CS}\left(\epsilon^{\frac{E_{CB}}{p}} - 1\right) \quad (2)$$

where $I_{ES}$ and $I_{CS}$ are the reversed saturation currents and $p = kT/q$. The transistor parameters are related as $\alpha_N I_{ES} = \alpha_I I_{CS}$. The positive direction of current is into the p-type material or out of the n-type material, and that of the voltage drop is from p-type to the n-type material. The voltage developed across the emitter base junction of a p-n-p transistor shown in FIG. 1 due to an input current $I_{E_1}$ can be determined from Eq. 1 and is given by $$E_{EB_1} = p_1 \log_\epsilon \left[\frac{I_{E_1} + I_{ES_1}(1-\alpha_N)}{I_{ES_1}}\right] \quad (3)$$

Now $E_{EB_1}$ and $I_{E_1}$ may be expressed as $$E_{EB_1} = E_{EQ_1} + e_{e_1} \text{ and } I_{E_1} = I_{EQ_1} + L_{e_1}$$

where $E_{EQ_1}$ and $e_{e_1}$ are the D.C. and A.C. components of the emitter base voltages due to the corresponding current passing through the same junction. The A.C. output of the logarithmic stage is then $$e_{e_1} = E_{EB_1} - E_{EQ_1} \quad (4)$$

substituting the values of $E_{EB_1}$ the output voltage may be expressed as:

$$e_{e_1} = p_1 \log_\epsilon \left[\frac{I_{E_1} + I_{ES_1}(1-\alpha_{N_1})}{I_{EQ_1} + I_{ES_1}(1-\alpha_{N_1})}\right] \quad (5)$$

Figure 2:
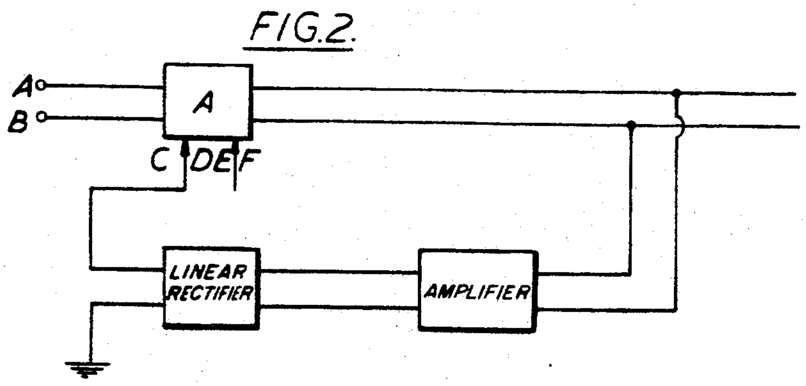
FIG. 2 shows a circuit block diagram where the multiplier and divider circuit of FIG. 1 is used as a compressor following a square root law in conjunction with an associated circuit.

The collector current of the exponential stage in FIG. 2 may be expressed as $I_{C_2} = I_{C_2} + i_{C_2}$ and may be expressed in terms of emitter base voltages as given Eq. 2. If the emitter base of the exponential stage consists of a D.C. voltage $E_{EQ_2}$ due to an input junction current $I_{EQ_2}$ and the A.C. output voltage $e_{e_1}$ of the logarithmic stage, then the A.C. component of the collector current is given by:

$$L_{C_2} = I_{C_2} - I_{CQ_2} = -\alpha_{N_2} I_{ES_2} \epsilon^{\frac{E_{EQ2}}{P_2}} \left[\epsilon^{\frac{e_{e_1}}{p_2}} - 1\right] \quad (6)$$

where $$E_{EQ_2} = p_2 \log_\epsilon \left[\frac{I_{EQ_2} + I_{ES_2}(1-\alpha_{N_2})}{I_{ES_2}}\right] \quad (7)$$

substituting the values of $e_{e_1}$ and $E_{EQ_2}$ from Eqs. 5 and 7 in Eq. 6 and assuming that $p_1 = p_2$ and $\alpha_{N_1} = \alpha_{N_2} = \alpha$ for similar transistors under almost identical conditions $$L_{C_2} = -\alpha_N L e_1 \frac{I_{EQ_2} + I_{ES_2}(1-\alpha_N)}{I_{EQ_1} + I_{ES_1}(1-\alpha_N)} \quad (8)$$

If $I_{ES}(1-\alpha_N)$ is negligible compared to $I_{EQ}$ currents then $$L_{C_2} = -\frac{\alpha_n I_{EQ_2}}{I_{EQ_1}} L_{e_1} \quad (9)$$

This equation shows that in addition to the fact that an A.C. signal can be multiplied and divided by two variables respectively it is also possible to obtain the quotient of these variables as well as the reciprocal of one of them.

Unlike the conventional logarithmic multipler circuits, an A.C. carrier or signal input is used here and the division is effected by variation of the polarising current of the logarithmic stage while the multiplication is effected by variation of the polarising current in the exponential stage. The magnitude of the A.C. output may thus indicate either the ratio of two variables or the direct or inverse variation of a quantity according to the variation of the controlling signals. By cascading several such stages the number of variables may accordingly be increased. In the present case, the respective non-linearities are obtained from the current voltage characteristics of a semi-conductor diode or transistor by properly selecting the dependent and independent variables.

Further it is well known that the voltage/current relationship across a semi-conductor junction is nearly logarithmic over a considerable range. This property may be utilised in the design of the logarithmic stage. Thus a junction diode may be used in which case the voltage developed across the diode will vary as the logarithm of the current input into the diode.

For the exponential stage a junction transistor is very suitable as the output is conveniently taken from the collector, the input voltage being applied to the emitter base junction.

The purpose of the coupling stage is to transfer the voltage developed across the logarithmic stage substantially to the base emitter junction of the transistor in the exponential stage. A requirement of the coupling stage is that it should not draw any appreciable current from the logarithmic stage which would upset the logarithmic relation between the voltage and current. At the same time its output voltage should not change appreciably with variations in the current drawn by the exponential stage. In other words, the coupling stage should have a high input impedance and low output impedance and a voltage gain of almost unity.

The operation of the system is based on two nonlinearities of complementary characteristics. There is a mutual cancellation of distortion arising out of the individual nonlinearities and of thermal drifts due to change of some of the transistor parameters with the ambient temperature. Unlike the normal logarithmic multiplier, this system uses an A.C. signal with the result that A.C. coupling is used here and the drift associated with D.C. circuits is thus absent.

When the A.C. voltage which is developed across the output of a logarithmic stage consisting of the emitter base junction of a p-n-p transistor due to a varying input signal, is applied to the input of an exponential stage of a similar transistor together with a D.C. polarising current through it, then the A.C. collector output not only varies directly as the A.C. input and the D.C. bias current of the exponential stage but also inversely as the polarising current through the logarithmic stage.

Referring to the accompanying drawings:

FIG. 1 shows the electronic analogue multiplier and divider circuit of this invention.

The logarithmic stage consists of a transistor $TR_1$ resistance $R_1$, $R_3$, $R_5$ and $R_6$ and a capacitor $C_1$.

V*in* is an A.C. input voltage applied to terminals AB. $R_1$ is a high resistance provided in the input circuit in order that the A.C. flowing into the emitter of $TR_1$, varies directly as the input voltage. It is necessary that the resistance of $R_1$ should be of a high value in order to make the resistance across the transistor $TR_1$ negligible in comparison with $R_1$, and thus making the current proportional to the input voltage. It is also necessary that the resistance of $R_3$ is of a high value so that constant voltage input at terminals CD is changed to a constant current source. $R_5$ and $R_6$ are resistances to provide a small bias to counteract the negative voltage developed across the emitter base junction of $TR_1$ due to the negative voltage on the collector. It is also essential that $R_5$ and $R_6$ should be of a high value in order that the input currents are not bypassed by these resistances. A D.C. voltage is applied at terminals CD of the logarithmic stage and the value of the resulting variable D.C. current should always be greater than the amplitude of the A.C. flowing through the logarithmic stage junction.

The collectors of $TR_1$ and $TR_3$, the latter being the transistor of the exponential stage, are connected to the same supply voltage to make the value of the transistor parameters substantially equal for both stages.

The D.C. voltage $V_y$, applied on the terminals CD, forms the divider voltage. This voltage causes a D.C. current to flow to the emitter of $TR_1$ and the A.C. current is superimposed on the D.C. current. One reason for the application of the voltage $V_y$ is to provide the necessary polarising current to accept the A.C. signal at the input. The other reason is that the variation of the voltage $V_y$ gives an output voltage of the circuit proportional to the reciprocal of $V_y$ thus performing the operation of division.

The coupling stage consists of a transistor $TR_2$, resistors $R_7$, $R_8$ and $R_9$ and an input coupling capacitor $C_2$ and an output coupling capacitor $C_3$.

The coupling stage is essentially an emitter follower and the reason for this being that the exponential stage draws a certain amount of current. When a voltage is applied across the emitter and the base of $TR_3$ which is the transistor for the exponential stage a certain current flows which without the coupling stage comes from the logarithmic stage which thereby loads the logarithmic stage and upsets the logarithmic relationship between the current and the voltage. The coupling stage acts as an impedance transformer. It provides a high impedance to the logarithmic stage and a low impedance to the exponential stage. As mentioned, earlier, the voltage developed across $TR_1$ should remain the same as when it is applied to the exponential stage. It is of primary importance that the A.C. component of the voltage developed across $TR_1$ should be taken.

$C_2$ is a coupling capacitor in order to obtain an A.C. component from the output of the logarithmic stage, which component is fed to the coupling stage and thereafter to the exponential stage. The resistors $R_7$ and $R_8$ function as a potential divider to provide the proper bias current to $TR_2$ for linear operation. Therefore the voltage applied at the input of $TR_2$ appears across $R_9$ undistorted and it is preferable that the gain of the stage should be approximately unity.

The exponential stage consists of the transistors $TR_3$, resistors $R_4$ and $R_{10}$. $R_{10}$ is of a medium value resistance and acts as compensating resistance for extension of the range of operation of $TR_3$ and should be found experimentally for the each different transistor. A D.C. voltage $V_x$ is applied at terminal EF through a high resistance $R_4$. The purpose of $R_4$ is to change the constant voltage source at EF into a constant current source. The A.C. signal of the coupling stage is superimposed on the D.C. signal. The D.C. voltage developed across the emitter base should always be greater than the A.C. voltage. The output across the load resistance $R_2$ gives us a voltage which is the product of the input voltage V*in* and the ratio of the D.C. signals.

If for example multiplication is required only, then $V_y$ is kept constant and $V_x$ is varied. Similarly to obtain a division, $V_x$ is kept constant and in this case $V_y$ is varied.

The coupling stage as described above may conveniently be replaced by a coupling circuit consisting of a capacitor $C_2$. The function of $C_2$ is similar to that of the coupling stage. However it would be necessary in this case to arrange the exponential circuit whereby the A.C. input impedance, as viewed in the direction of arrow A, should be much greater than the A.C. output impedance of the logarithmic stage when viewed in the direction of the arrow B.

In FIG. 2 of the accompanying drawings we have shown a circuit block diagram where the multiplier and divider of this invention is used as a compressor following a square root law in conjunction with an associated circuit. The output of the multiplier and divider A is fed to an amplifier wherein the signals are amplified in accordance with any method as known in the prior art. The output of the amplifier is rectified by a linear rectifier thus producing a D.C. output. The unipolar output from the linear rectifier is fed to the terminals CD, as defined in FIG. 1 of the logarithmic stage of the multiplier and divider A. Under this condition the multiplier input is given a proper polarising potential at EF, as defined with respect to FIG. 1, of the exponential stage so that the magnitude of the A.C. signal coming to the input of the exponential stage of the multiplier and divider A is always less than the D.C. polarising input.

Figure 3:
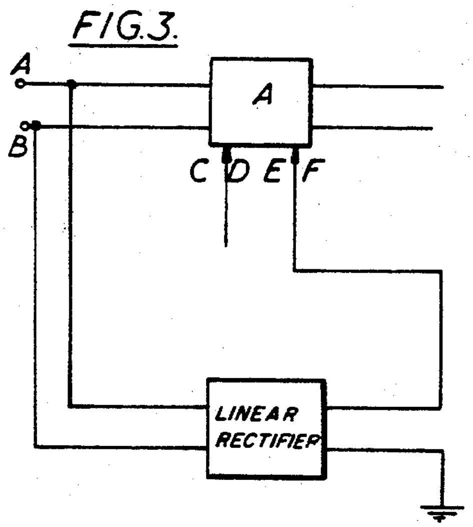
FIG. 3 shows a circuit block diagram where the multiplier and divider circuit of FIG. 1 is used as an expander or squarer in conjunction with an associated circuit.

Referring to FIG. 3, we have shown a block diagram of the multiplier and divider A as an expander or squarer in conjunction with an associated circuit. As it is known, the function of the expander is for example to square the amplitude of a signal. An A.C. signal is fed to the multiplier and divider circuit at terminal AB and simultaneously taken along a parallel path and rectified through a linear rectifier. The rectified output is fed through the terminals EF, as defined in FIG. 1 of the exponential stage of the circuit A. At the terminal CD, a polarising potential is applied so that a current $I_{EQ_1}$ flowing through the CD terminal, should always be greater than the magnitude of the A.C. due to the applied A.C. input signal.

Figure 4:
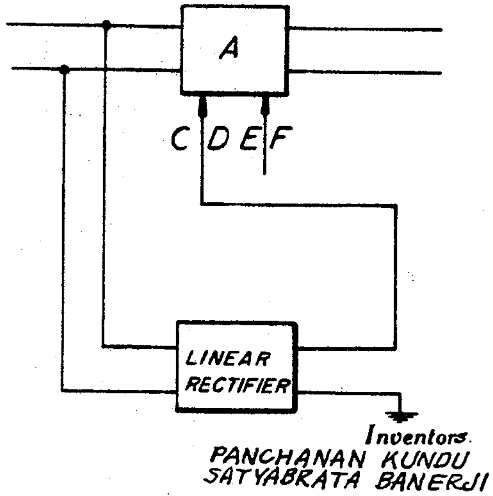
FIG. 4 shows a circuit block diagram of the multiplier and divider circuit of FIG. 1 when used as an amplitude stabilizer in conjunction with an associated circuit.

In FIG. 4 of the drawings we have shown a block diagram of the circuit as an amplitude stabilizer. The signal is fed to the input of the multiplier and divider circuit A, and the CD terminal current is controlled by the output of the linear rectifier, the latter being fed by the input signal. At the EF terminal a polarising potential is applied such that the potential developed across the emitter base of the exponential stage remains always greater in magnitude than the maximum value of the A.C. signal applied to its input.

Figure 5:
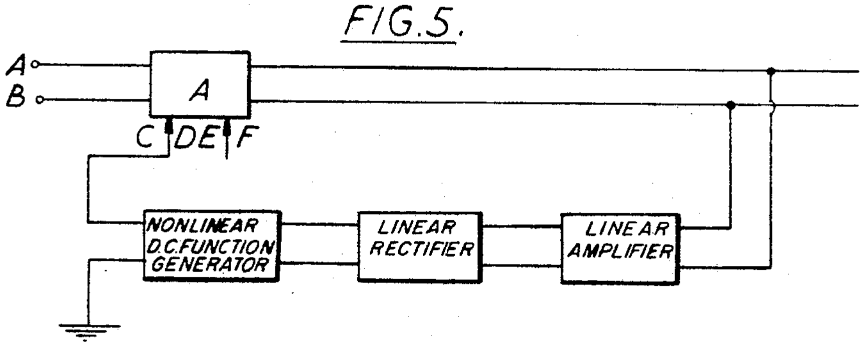
FIG. 5 shows a circuit block diagram of the multiplier and divider circuit of FIG. 1 when used as a rooter other than a square rooter in conjunction with an associated circuit.

When the multiplier and divider of this invention is used as rooter other than a square rooter, such that if $A \sin wt$ is an input signal the output obtained is given by $A^k \sin wt$. where "$k$" may be any fraction. The circuit employed is used as a rooter as shown in FIG. 5.

A signal $A \sin wt$ is applied at the input terminals AB of multiplier and divider circuit A. The output of the multiplier and divider circuit is fed to a linear amplifier whereby the signal is amplified to a desired value. The amplified signal is then rectified by means of a linear rectifier and the rectified output is applied to a nonlinear D.C. function generator having a variable exponent $n$. The CD terminal current of the log stage, and as defined in FIG. 1, is controlled by the output of the nonlinear D.C. function generator. A constant polarising potential is applied at the terminals EF. The exponent can be varied by varying the exponent of the function generator. Under such conditions an output is obtained which is given by $$A^{\frac{1}{n+1}}$$

$\sin wt$.

Figure 6:
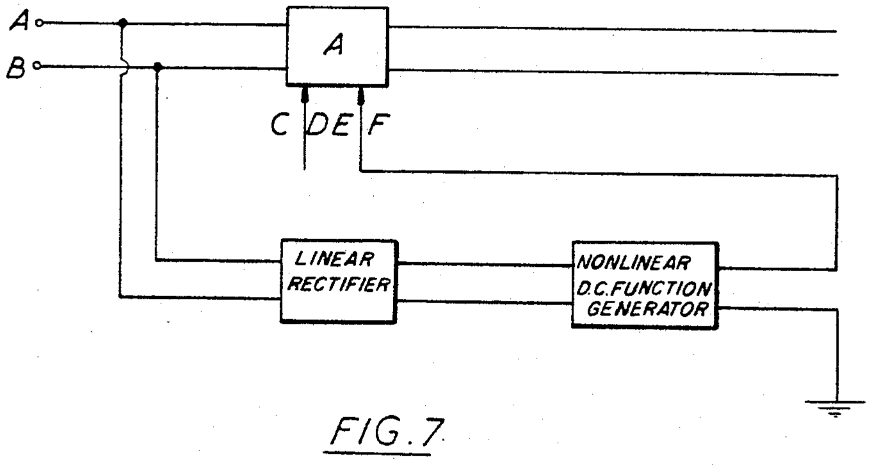
FIG. 6 shows a circuit block diagram of the multiplier and divider circuit of FIG. 1 when used as a power law amplifier in conjunction with an associated circuit.

As a corollary when the multiplier and divider is used as a power law amplifier, the circuit which may be used is shown in FIG. 6.

A signal $A \sin wt$ is applied to the terminals AB of the multiplier and divider A and also simultaneously to a linear rectifier. The rectified output is passed through a nonlinear function generator having an exponent $n$, the output of said function generator controlling the current $I_{EQ_2}$ at termials EF of the multiplier and divider circuit A. The function of $I_{EQ_1}$ is as defined in the previous circuits. The output is then given by $A^{n+1} \sin wt$.

Figure 7:
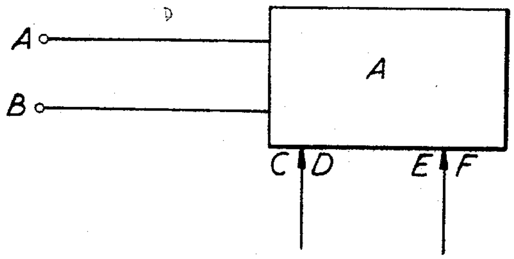
FIG. 7 shows a circuit block diagram of the multiplier and divider circuit of FIG. 1 when used as a linear amplitude modulator in conjunction with an associated circuit.

The multiplier and divider circuit may also be used as a linear amplitude modulator having the circuit as shown in FIG. 7.

A signal $A \sin wt$ is fed into the input AB of the multiplier and divider circuit A and $I_{EQ_2}$ is controlled by the modulating A.C. signal $B \sin pt$ with $I_{EQ_1}$ having a fixed value as herein before defined. The output as given by $KA(1+m \sin pt) \sin wt$ where $m$ is given by $$\frac{B}{I_{EQ_2}}$$

The multiplier and divider may also be used as a variable gain linear amplifier wherein the gain may be varied by varying the ratio of the two D.C. voltages at the terminals CD and EF. This type of variable gain amplifier has two definite advantages in so far as transistor amplifiers are concerned. Firstly, the inherent nonlinearity of transistor amplifiers are absent here because of the fact that two nonlinearities of inverse characteristics are used here such that the nonlinearity due to one is eliminated by the other. Secondly, the inherent instability of the transistors due to temperature variation are also eliminated due to the fact that variation of the log stage is nullified by an inverse variation in the exponential stage.

Figure 8:
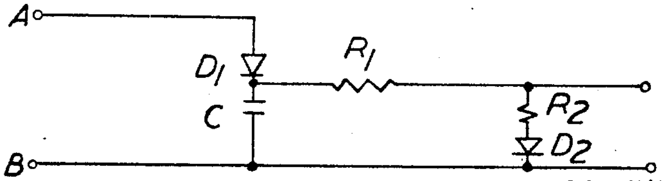
FIG. 8 shows a linear rectifier circuit.

The linear rectifier as shown in FIG. 8 has a circuit which includes a rectifier $D_1$ in series with a capacitor C across the input terminals AB. Resistors $R_1$ and $R_2$ are connected in series with a nonlinear resistor, such as a semi-conductor diode $D_2$ across said capacitor. The output is taken across the resistor $R_2$ and the nonlinear resistor.

What is claimed is:

1. An electronic analogue multiplier and divider having a circuit which comprises a logarithmic stage coupled through an A.C. coupling stage to an exponential stage, said logarithmic stage being fed by an A.C. signal, separate variable D.C. signals being applied to the logarithmic and exponential stage, the output of said circuit being taken from the output of said exponential stage, said logarithmic stage providing an output which is a logarithmic relationship between the output voltage thereof and the A.C. and D.C. signals applied thereto, said exponential stage providing an output which is an exponential function of the A.C. component of the logarithmic stage and the variable D.C. signal applied thereto and which thus represents the product of the A.C. input signal and the ratio of the D.C. signal applied to the exponential stage to the D.C. signal applied to the logarithmic stage.

2. An electronic analogue multiplier and divider as claimed in claim 1 having a circuit which comprises a logarithmic and an exponential stage coupled by an A.C. coupling circuit.

3. An electronic analogue multiplier and divider as claimed in claim 2 wherein the said coupling circuit includes a capacitor providing a low impedance to the A.C. carrier, said logarithmic and exponential stages being connected through said coupling capacitor.

4. An electronic analogue multiplier and divider as claimed in claim 1 wherein said logarithmic stage has a circuit which includes one or more semi-conductor junctions, means provided in the A.C. signal input circuit and D.C. input circuit of the logarithmic stage such that the A.C. signal and variable D.C. signal appear to be fed to the semiconductor junction as though from constant current source.

5. An electronic analogue multiplier and divider as claimed in claim 4 wherein said means comprise an A.C. signal source having a low impedance, said source connected to a high impedance provided in said A.C. signal input circuit, and a variable D.C. signal source having a low impedance, said D.C. signal source connected to a high impedance provided in the D.C. input circuit.

6. An electronic analogue multiplier and divider as claimed in claim 4 wherein said means comprise a constant current A.C. source provided in the A.C. signal input circuit and a constant current D.C. source provided in the D.C. voltage input circuit.

7. An electronic analogue multiplier and divider as claimed in claim 4 wherein the said semi-conductor junction is the emitter base junction of a grounded base transistor.

8. An electronic analogue multiplier and divider as claimed in claim 4 wherein the said semi-conductor junction is a base emitter junction of a grounded emitter transistor.

9. An electronic analogue multiplier and divider as claimed in claim 4 wherein means are provided for applying a negative potential across the emitter base junction of the p-n-p transistor and a positive potential to the n-p-n transistor.

10. An electronic analogue multiplier and divider as claimed in claim 1 wherein the exponential stage includes one or more semi-conductor junctions, the input of said junction being connected to the low A.C. impedance of the coupling stage or circuit for the A.C. voltage and to a high impedance provided in the constant D.C. voltage input circuit of said exponential stage, the value of said high impedance being such that the constant voltage input is changed to a constant current source.

11. An electronic analogue multiplier and divider as claimed in claim 1 wherein the coupling stage includes a transistor having a high input impedance and a low output imepdance, said coupling stage being connected to the logarithmic stage through a low coupling impedance for the A.C. carrier.

12. An analogue multiplier and divider of claim 1 whenever used as a compressor in conjunction with an associated circuit comprising an amplifier provided in the output circuit of said multiplier and divider, a linear rectifier connected to the amplifier thus providing a D.C. output and which is fed to the constant voltage input circuit of the logarithmic stage of said multiplier and divider, a multiplier input having a proper polarizing potential being fed to the constant voltage input terminals of the exponential stage and such that the magnitude of the A.C. signal coming to the input of the exponential stage of said multiplier and divider is always less than the polarizing input.

13. An analogue multiplier and divider as claimed in claim 1 whenever used as an expander or squarer in conjunction with an associated circuit which includes a linear rectifier and wherein the signal is fed simultaneously to the said multiplier and divider and the said linear rectifier, the output of said linear rectifier being fed to the exponential stage of the said multiplier and divider and a polarizing potential being applied to the constant voltage input terminals of the logarithmic stage.

14. An analogue multiplier and divider as claimed in claim 1 whenever used as an amplitude stabilizer in conjunction with an associated circuit wherein the signal is fed simultaneously to the multiplier and divider circuit and fed to the linear rectifier, the output of said rectifier being fed to the logarithmic stage of said multiplier circuit and a polarizing potential being applied to the constant voltage input terminals of the exponential stage.

15. An analogue multiplier and divider as claimed in claim 1 whenever used as a rooter in conjunction with an associated circuit wherein the signal is fed to the multiplier and divider circuit, the output of which being amplified through a linear amplifier, said amplifier signal being fed to a linear rectifier and thereafter to a nonlinear function generator, the output said generator being fed to the logarithmic stage of the multiplier and divider circuit.

16. An analogue multiplier and divider as claimed in claim 1 whenever used as a power law amplifier, wherein the signal is fed simultaneously to the multiplier and divider circuit, and a linear rectifier and the rectified output being passed through a nonlinear function generator, said generator output being fed to the exponential stage of the multiplier and divider circuit.

17. An analogue multiplier and divider as claimed in claim 1 whenever used as a linear amplitude modulator.

18. An electronic analogue multiplier and divider as claimed in claim 1 whenever used as an amplifier wherein the gain is varied by adjusting the voltages applied to the terminals of the D.C. input circuits.

References Cited

UNITED STATES PATENTS

| | | | |
|---|---|---|---|
| 2,560,170 | 7/1951 | Gray | 235—196 X |
| 2,817,715 | 12/1957 | Blake | 328—160 X |
| 3,017,106 | 1/1962 | Patterson | 235—195 X |
| 3,152,250 | 10/1964 | Platzer | 235—195 X |

MALCOLM A. MORRISON, *Primary Examiner.*

J. RUGGIERO, *Assistant Examiner.*